United States Patent
Snapp, Jr.

[11] 3,817,996
[45] June 18, 1974

[54] CYCLIZATION PROCESS
[75] Inventor: Thomas C. Snapp, Jr., Longview, Tex.
[73] Assignee: Eastman Kodak Company, Rochester, N.Y.
[22] Filed: Sept. 19, 1972
[21] Appl. No.: 290,294

[52] U.S. Cl. .......... 260/244 R, 260/333, 260/340.6, 260/340.7, 260/345.1, 260/346.1 R, 252/458, 252/467, 252/470, 260/340.2
[51] Int. Cl. .......................................... C07d 87/50
[58] Field of Search ... 423/595, 23; 260/244, 346.1, 260/345.1, 333, 340.7, 340.6, 340.2; 252/467

[56] References Cited
UNITED STATES PATENTS
3,154,544  10/1964  Langdon et al. .................... 260/247

*Primary Examiner*—Harry I. Moatz
*Attorney, Agent, or Firm*—Edward R. Weber; C. D. Quillen, Jr.

[57] ABSTRACT

Unsaturated cyclic compounds of the type

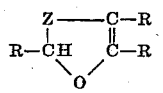

are prepared by a from the which comprises contacting a mixture of hydrogen, and a feed stock of the type

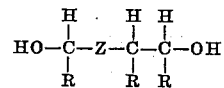

in the liquid phase at temperatures of from about 190°C. to about 240°C. in contact with a catalyst comprising:
1. a component selected from the group consisting of copper chromite, or copper on a support; and
2. a tungstic acid.

In the above formulas, Z is the radical

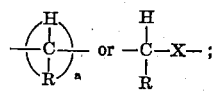

R is H or an alkyl radical containing 1 to 4 carbon atoms; a is a number from 1 to 3 and X is either —O—, or the radical

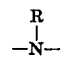

R can be either the same or different at different locations within the molecule. The unsaturated ring products formed by this process, of which p-dioxene is a typical member, are valuable intermediates in the preparation of polymers useful, for example, as viscosity improvers for motor oils and in oxonation and epoxidation reactions to yield cyclic aldehydes and alcohols which are useful, for example, as plasticizers, surface active agents and adhesives.

18 Claims, No Drawings

CYCLIZATION PROCESS

This invention relates to the synthesis of unsaturated cyclic compounds of which p-dioxene (i.e., 2,3-dihydro-p-dioxin) is a typical example. More particularly, it is concerned with a novel and improved catalytic process for simultaneously dehydrating and dehydrogenating certain saturated glycols to form cyclic compounds.

The unsaturated cyclic compounds produced by the process of this invention, of which p-dioxene is a well-known example, have found many uses throughout the chemical industry. For example, these compounds are useful as solvents per se, as well as valuable intermediates in the preparation of polymers, e.g., urethane applications, and viscosity improvers for motor oils, and in oxonation and epoxidation reactions to yield cyclic aldehydes and alcohols which have application as plasticizers, surface active agents and adhesive formulations.

p-Dioxene, a compound typical of those formed by the process of this invention, has previously been prepared in low yields by the reaction of 2,3-dichloro-1,4-dioxane with Grignard reagents such as methyl, ethyl or 1-butyl magnesium bromide, and by the reaction of 2,3-dichloro-1,4-dioxane with magnesium iodide. It has been prepared in low yields by the catalytic vapor-phase dehydrogenation-dehydration of ethylene glycol and in small amounts as a by-product from the copper chromite-catalyzed dehydrogenation of diethylene glycol. p-Dioxene has also been prepared by the liquid-phase dehydrogenation-dehydration of diethylene glycol over certain catalysts, e.g., copper chromite and copper. Using a copper chromite catalyst in admixture with potassium acid sulfate, the liquid-phase reaction is said to result in conversion to p-dioxene on the order of 35–45 percent, whereas metallic copper in admixture with potassium acid sulfate results in a reported yield of less than 25 percent. However, when the potassium acid sulfate is omitted, the major product formed in the liquid-phase reaction is 2-p-dioxanone, e.g., the use of copper chromite per se results in a yield to p-dioxene on the order of 2 percent, and copper chromite in admixture with 2% $Cr_2O_3$ on silica gel gives a yield to p-dioxene on the order of 15 percent. While the liquid-phase reaction provides improved yields in comparison to other known methods of preparing p-dioxene, it has certain disadvantages, such as slow reaction rates and an undesirable decline in catalyst life and activity. More recently a p-dioxene synthesis (U.S. Pat. No. 3,592,825) has been reported by the vapor-phase dehydrogenation-dehydration of diethylene glycol with a metal impregnated silica of specific physical properties.

It is, therefore, an object of the invention to provide a process for the production of unsaturated cyclic compounds of the type previously indicated by the catalytic liquid-phase simultaneous dehydrogenation and dehydration of a glycol.

It is a further object of the invention to provide a process wherein high selectivity to the desired cyclic compound is obtained.

Yet another object of the invention is to provide a process wherein good catalyst life and activity is maintained.

Other objects and advantages of the invention will become apparent from consideration of the specification and claims of this application.

In accordance with the present invention there is provided a novel liquid-phase process for the synthesis of unsaturated cyclic compounds by the simultaneous dehydrogenation and dehydration, in a hydrogen atmosphere at elevated temperatures, of a saturated glycol having the general formula:

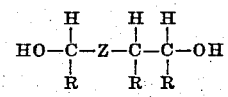

wherein Z is a radical selected from the group consisting of

or

and $a$ is 1, 2 or 3, X is —O— or the radical

and R is H or an alkyl group of 1 to 4 carbon atoms. The R's at different points in the molecule may be the same or different. Since these saturated glycols are relatively low-cost, commercially-available materials, the process of the instant invention provides a convenient and economical method of preparing unsaturated cyclic compounds. The preparation of these unsaturated cyclic compounds can be illustrated by the following equation:

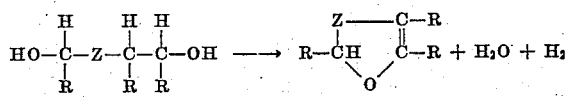

wherein Z and R are as previously described.

For purposes of further discussion the synthesis of p-dioxene from diethylene glycol will serve to illustrate a typical embodiment of this invention. The simultaneous cyclization, dehydrogenation and dehydration of diethylene glycol to p-dioxene according to the process of this invention is effected by contacting liquid diethylene glycol with hydrogen and a particular catalyst. The reaction can be conveniently effected in a liquid slurry reactor. The hydrogen and diethylene glycol are separately fed to the reactor wherein the dioxene is removed as the distillate. Temperatures of 190° to 240°C. are very effective with the copper-tungsten acid catalyst for dioxene synthesis. The reaction may be operated at both atmospheric or greater than atmospheric pressures. The residence time in the reactor will vary with the temperature, but is usually from 0.1 to 10.0 hours, preferably from 0.5 to 8.0 hours. "Residence time" is defined as the period of time that a unit volume of reacting glycol is in contact with the catalyst under the conditions of the reaction. The effluent reaction products can be treated to separate the desired product by any suitable means, such as by fractional distillation.

It is a particular feature of this invention that good conversion and yields of the desired cyclic compound based on the feed glycol are obtained while at the same time catalyst life is increased and the activity of the catalyst is maintained at high levels. This is particularly surprising since the following three competitive reactions (dehydrogenation, dehydration, and dehydrogenation-dehydration) would be expected to exist in the reaction zone.

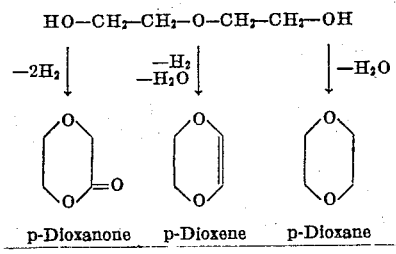

The dehydrogenation reaction would produce p-dioxanone whereas dehydration would yield p-dioxane. Dioxanone and dioxane formation apparently is suppressed by the copper-tungsten acid catalyst of the instant invention so that the dehydrogenation-dehydration reaction to yield dioxene is predominant.

According to the process of the present invention, an excess of hydrogen together with the desired feed glycol are contacted with a novel catalyst system, thereby resulting in the selective conversion of the feed glycol to an unsaturated cyclic compound of the type previously illustrated in high conversions and yields.

As noted, a particular feature of the present invention is the use of a novel catalyst which permits the selective production, in the liquid phase, of p-dioxene from diethylene glycol. The novel catalyst of this invention is a dual-component system. One component is copper metal impregnated on a support or a copper chromite. The support can be silica gel, silica-alumina, pumice, Kieselguhr, silicon carbide, or carbon. Copper content on these supports should be 3–30 weight percent. Higher copper impregnated supports preferably are impractical as the maximum metal loading on the support has been surpassed.

The copper component of the catalyst of the instant invention can be prepared by a process comprising: (1) impregnating a soluble salt of the copper, such as the metal nitrate, onto the selected support; (2) thermally decomposing the metal salt to the corresponding metal oxide; and (3) reducing the metal oxide with hydrogen to obtain the metal impregnated supported catalyst of the invention. Any soluble metal salt of copper, or mixtures thereof which can be decomposed to the corresponding oxide, can be used in preparing the catalysts of the invention. The soluble organic and inorganic salts of copper include the nitrates, acetates, halides and sulfates, etc. See, for example, the solubility tables of "Handbook of Chemistry and Physics", Chemical Rubber Publishing Co., Cleveland, Ohio, 34th ed. (1952). The inorganic nitrate salts are preferred.

The copper chromite catalysts may be prepared by a number of different procedures, for example, by the decomposition of copper ammonium chromate, by the decomposition of copper ammonium chromium carbonates, by the decomposition of copper-chromium nitrates or by grinding or heating together copper oxide and chromium oxides. Although the products of these reactions are generally regarded to be composed of copper oxide and chromium oxide of the general formula $CuCr_2O_4$, Stroupe, in J. Amer. Chem. Soc., 71, 569 (1949) indicates the exact nature of such copper-chromium oxides is not known. Any preparation that produces copper oxide in combination with chromium oxide is acceptable to prepare said catalyst with the product formed by the decomposition of the copper ammonium chromate being one of the best since the product is a fine mesh size (100–200 mesh).

The copper ammonium chromate salts may be prepared by mixing aqueous solutions containing molar equivalents amounts of copper nitrate and ammonium chromate. The precipitate thus formed is recovered and, when slightly heated, decomposes spontaneously with the evolution of heat to form copper-chromium oxide. The copper chromite catalyst will preferably have a copper content of from about 35 to about 90 weight percent expressed as CuO.

Various commercial copper chromite catalysts are available which can be used in the practice of this invention, for example, Harshaw Cu 0202 powder which contains 82 weight percent CuO and 17 weight percent $Cr_2O_3$, Harshaw 1800 powder copper chromite which possesses 51 weight percent CuO and 47 weight percent $Cr_2O_3$, and Girdler's G–13 copper chromite powder which contains 42 weight percent copper and 26 weight percent chromium, have been found to be effective.

The second catalyst component must be a tungstic acid or a heteropolytungstic acid such as 12-silicotungstic, 11-tungstoferric, 11-tungstoaluminic, 11-tungstochromic and 11-tungstomanganic acids. If desired, the tungstic acid component can be impregnated either on a separate support or upon the same support as the copper component.

The novel catalyst system is composed of a mixture of the two components such as to have from about a 2:1 to about a 35:1 weight ratio of copper catalyst to acid. Proportions outside these limitations on the weight ratio of the catalyst system result in increased production of either p-dioxanone or p-dioxane. A lower ratio (less than 2:1) promotes dehydration whereas a higher ratio (greater than 35:1) enhances the dehydrogenation reaction to p-dioxanone. A preferred mixture will have a copper catalyst to acid ratio of from about 6:1 to about 15:1.

The catalyst concentration in the reactor may be from 1 to 50 weight percent based on the diethylene glycol content in the reactor. Excellent results are obtained in the preferred concentration range of 10–35 weight percent.

No special techniques of combination of the two components of the catalyst are required, and the order of addition to the reactor has no apparent effect upon the activity of the catalyst.

The addition of hydrogen to the dioxene reactor facilitates the reaction since it maintains an activated copper catalyst and insures the rapid removal of dioxene and water. Hydrogen can be replaced by nitrogen, but a slow loss in catalytic activity will be noted. A broad volume ratio (1:0.1 to 1:8.0) of hydrogen to diethylene glycol can be fed to the dioxene reactor to give good conversions and yields to dioxene. A preferred hydrogen-to-glycol ratio is from about 1.0:0.5 to about 1.0:4.0. The effect of added hydrogen was unexpected since one would predict dehydrogenation reactions should be conducted in the presence of minimal hydrogen in order to influence the reaction in the desired direction. Furthermore, one would predict the added hydrogen would enhance the hydrogenation of p-dioxene to p-dioxane in the presence of the copper catalyst. To the contrary, the presence of excess hydrogen presents no problems in this new process for p-dioxene synthesis.

It should be recognized that the previous discussion which has specifically dealt with the synthesis of p-dioxene from diethylene glycol is illustrative of only a particular species of this reaction and that any glycol of the generic type previously set forth could be substituted for the diethylene glycol and the product would be an unsaturated cyclic compound of the generic type previously set forth, of which p-dioxene represents one species.

The following examples are set forth for purposes of illustration, and it should be understood that they are not to be construed as limiting the invention in any manner.

EXAMPLE 1

This example describes the process wherein a copper chromite12-silicotungstic acid catalyst system converts diethylene glycol to p-dioxene. The reactor is charged with a catalyst concentration of 7.29 weight percent of copper chromite and silicotungstic acid (10:1 weight ratio, respectively) in diethylene glycol. The reaction is operated at 230°C. with a hydrogen flow rate of 12 liters per hour. The reaction is continued for 9 hours at atmospheric pressure by continuous addition of diethylene glycol to the reactor. Diethylene glycol feed rate is adjusted to give a hydrogen-to-diethylene glycol ratio of 1.0:1.18 and a diethylene glycol residence time of 5.1 hours. The reactor effluent shows a 53.7 percent conversion to p-dioxene, 1.8 percent conversion to p-dioxane and an 0.9 percent conversion to p-dioxanone based on diethylene glycol.

EXAMPLE 2

This example demonstrates the use of tungstic acid with copper chromite as a suitable catalyst system for synthesis of p-dioxene. The catalyst concentration is 8.30 weight percent of the diethylene glycol in the reaction with a 10:1 weight ratio of copper chromite to tungstic acid. Reaction at 225°C. with a hydrogen flow rate of 12 liters per hour gives a 32.6 percent conversion to p-dioxene, 1.3 percent conversion to p-dioxanone, and 6.5 percent conversion to p-dioxane. The ratio of hydrogen to diethylene glycol is 1.0:0.9 and the residence time is 7.0 hours.

EXAMPLE 3

An example with 12 silicotungstic acid impregnated on silica gel is given to show the catalyst system versatility. A catalyst consisting of a 2:1 mix by weight of copper chromite and 12 silicotungstic acid supported on silica gel (20% 12 silicotungstic acid) is used in a concentration of 9.69 percent based on the weight of diethylene glycol in the reactor. The reaction is run at 225°C. with a hydrogen:diethylene glycol ratio of 1.0:1.5 and a residence time of 4 hours to give a 36.0 percent conversion to p-dioxene from the glycol, 9.5% p-dioxane, and 8.1% p-dioxanone. Hydrogen and diethylene glycol, both separately preheated, are continuously added to the reactor to maintain proper catalyst concentration.

EXAMPLE 4

This example illustrates the use of a copper metal-silicotungstic acid impregnated on silica gel as a catalyst for p-dioxene synthesis. This catalyst is prepared as by addition of a solution of 159 grams of cupric nitrate trihydrate in 400 milliliters of water to 210 grams of Davison Grade 12 silica gel. After 24 hours the water is removed by evaporation at 90°-100°C. The copper nitrate impregnated silica is heated at 250°C. for 8 hours in an air atmosphere to yield a copper oxide on silica catalyst. A 125 gram portion of the copper oxide on silica catalyst is added to a solution of 6.25 grams of 12 silicotungstic acid in 200 milliliters of water. After 24 hours the water is removed by heating at 90°-100°C. The resulting catalyst is treated with hydrogen at 225°-250°C. for 6 hours to give a 20 weight percent copper/5 weight percent 12 silicotungstic acid on silica gel catalyst.

This catalyst in a 15.30 weight percent concentration based on weight of diethylene glycol is reacted at 230°C. with a hydrogen to diethylene glycol ratio of 1.0:3.73 and a residence time of 2 hours to give a 33.3 percent conversion to p-dioxene, 0.8 percent conversion to p-dioxane and 2.1 percent conversion to p-dioxanone.

EXAMPLE 5

A high catalyst concentration in diethylene glycol is shown in this example to illustrate the versatility of this process. A 28.23 weight percent catalyst charge (25.67 percent copper chromite and 2.56 percent 12 silicotungstic acid) in diethylene glycol at 230°C. in a hydrogen atmosphere gives a 54.6 percent conversion to p-dioxene, 2.8 percent conversion to p-dioxane and 1.1 percent conversion to p-dioxanone. The hydrogen-to-diethylene glycol ratio is 1.0:2.11 and the residence time is 3.1 hours.

EXAMPLE 6

This example demonstrates the use of 12 silicotungstic acid with a copper impregnated silica as a suitable catalyst system for p-dioxene synthesis. The copper on silica catalyst is prepared by impregnation of cupric nitrate trihydrate on Davison Grade 12 silica gel from an aqueous solution. The copper nitrate salt is converted to the oxide form by heat treatment at 250°C. for 6 hours. The copper oxide on silica is reduced to the copper impregnated silica catalyst by hydrogen at 300°C. A 35.7 weight percent catalyst charge (35 percent of 20 weight percent copper on silica and 0.7 percent 12 silicotungstic acid) in diethylene glycol at 225°C. in a hydrogen atmosphere gives a 30.2 percent conversion to p-dioxene, 1.8 percent conversion to p-dioxane and 2.1 percent conversion to p-dioxanone. The hydrogen-to-diethylene glycol ratio is 1.0:2.3 and the residence time is 1.0 hours.

The following table presents other generic illustrations wherein various feed materials are substituted for the diethylene glycol used in Example 1.

TABLE

| Example | Feed | Product | Conversion, %[1] |
|---|---|---|---|
| 7 | 1,5-Pentanediol | 2,3-Dihydropyran | 41 |
| 8 | Dipropylene Glycol | 2,6-Dimethyl-1,4-dioxene | 46 |
| 9[2] | 1,4-Butanediol | 2,3-Dihydrofuran | 26 |
| 10 | 1,6-Hexanediol | 4,5,6,7-Tetrahydrooxepin | 30 |
| 11 | N-Ethyldiethanolamine | 4-Ethyldihydro-1,4-oxazine | 33 |
| 12 | 3-Methyl-1,5-pentanediol | 4-Methyl-2,3-dihydropyran | 38 |

[1]Conversion is weight percent of feed converted to desired product.
[2]Reactor temperature is 205°C.

Although the examples of this invention are illustrated at atmospheric pressure, it has been found that this catalytic process can also be conducted at elevated or reduced pressures.

Although the invention has been described in detail with particular reference to preferred embodiments thereof, it will be understood that variations and modifications can be effected within the spirit and scope of the invention as described hereinabove.

I claim:

1. A process for producing an unsaturated cyclic compound having the formula $$\begin{array}{c} Z \longrightarrow C-R \\ | \quad \quad \| \\ R-CH \quad C-R \\ \diagdown O \diagup \end{array}$$

wherein Z is a radical selected from the group comprising

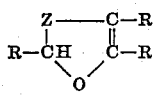

or

a is the numeral 1, 2 or 3, X is —O— or the radical

and R is the same or different and is H or an alkyl group of 1 to 4 carbon atoms, which comprises contacting hydrogen and a compound of the type

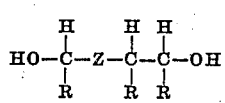

wherein R and Z are as previously defined, in a volume ratio ranging from about 1.0:0.1 to about 1.0:8.0, respectively, in the liquid phase at a temperature of about 190°C. to about 240°C. over a catalyst comprising: (1) a copper component selected from the group consisting of copper chromite, and copper on a support selected from the group consisting of silica gel, silica-alumina, pumice, Kieselguhr, silicon carbide and carbon; and (2) a tungsten component selected from the group consisting of tungstic acid, 12-silicotungstic acid, 11-tungstoferric acid, 11-tungstoaluminic acid, 11-tungstochromic acid, and 11-tungstomanganic acid.

2. A process according to claim 1 wherein said mole ratio of hydrogen to glycol is from about 1.0:0.5 to about 1.0:4.0.

3. A process according to claim 1 wherein the copper component of said catalyst comprises from about 3 to about 30 weight percent copper supported on a material selected from the group consisting of silica gel, silica-alumina, pumice, Kieselguhr, silicon carbide and carbon.

4. A process according to claim 1 wherein the copper component of said catalyst comprises a copper chromite.

5. A process according to claim 1 wherein the tungsten component of said catalyst is supported on a material selected from the group consisting of silica gel, silica-alumina, pumice, Kieselguhr, silicon carbide, and carbon.

6. A process according to claim 1 wherein said tungsten component is 12 silicotungstic acid.

7. A process according to claim 1 wherein said tungsten component is tungstic acid.

8. A process according to claim 1 wherein the ratio of copper component to tungsten component is from about 2.0:1.0 to about 35.0:1.0 by weight.

9. A process according to claim 8 wherein said ratio is from about 6:1 to about 15:1.

10. A process according to claim 1 wherein the concentration of the catalyst of the invention is from about 1 to about 50 weight percent, based on the diethylene glycol content in the reactor.

11. The process of claim 10 wherein the concentration of the catalyst is from about 10 percent to about 35 percent by weight, based on the diethylene glycol content in the reactor.

12. A process according to claim 1 wherein the feed material is diethylene glycol and the product is p-dioxene.

13. A process according to claim 1 wherein the feed material is 1,5-pentanediol and the product is 2,3-dihydropyran.

14. A process according to claim 1 wherein the feed material is dipropylene glycol and the product is 2,6-dimethyl-1,4-dioxene.

15. A process according to claim 1 wherein the feed material is 1,4-butanediol and the product is 2,3-dihydrofuran.

16. A process according to claim 1 wherein the feed material is 3-methyl-1,5-pentanediol and the product is 4-methyl-2,3-dihydropyran.

17. A process according to claim 1 wherein the feed material is 1,6-hexanediol and the product is 4,5,6,7-tetrahydrooxepin.

18. A process according to claim 1 wherein the feed material is N-ethyldiethanolamine and the product is 4-ethyldihydro-1,4-oxazine.

* * * * *